US009778090B2

(12) United States Patent
Hirt

(10) Patent No.: US 9,778,090 B2
(45) Date of Patent: Oct. 3, 2017

(54) SENSOR FOR DETERMINING A FILLING LEVEL

(71) Applicant: SICK AG, Waldkirch (DE)

(72) Inventor: Günter Hirt, Waldkirch (DE)

(73) Assignee: SICK AG, Waldkirch (DE)

( * ) Notice: Subject to any disclaimer, the term of this patent is extended or adjusted under 35 U.S.C. 154(b) by 367 days.

(21) Appl. No.: 14/600,405

(22) Filed: Jan. 20, 2015

(65) Prior Publication Data
US 2015/0241263 A1 Aug. 27, 2015

(30) Foreign Application Priority Data
Feb. 21, 2014 (DE) .......... 10 2014 102 295

(51) Int. Cl.
G01C 3/08 (2006.01)
G01F 23/292 (2006.01)
G01S 17/08 (2006.01)

(52) U.S. Cl.
CPC ............ *G01F 23/292* (2013.01); *G01S 17/08* (2013.01)

(58) Field of Classification Search
CPC ..... G01S 17/08; G01F 23/292; G01F 23/2928
USPC ....................................... 356/5.01
See application file for complete search history.

(56) References Cited

U.S. PATENT DOCUMENTS 4,658,149 A 4/1987 Miranda et al.
5,030,010 A * 7/1991 Birkle .................. G01N 21/255
250/227.25
6,443,022 B1 * 9/2002 Gordon ................. G01F 23/292
73/290 R
9,216,032 B2 * 12/2015 Bahls .................. A61B 17/3203
2007/0125162 A1 * 6/2007 Ghazi ..................... G01F 1/007
73/149
2010/0006786 A1 * 1/2010 Babin ................. G01F 23/2928
250/577

FOREIGN PATENT DOCUMENTS

DE 3704960 A1 8/1988
DE 3704960 C2 11/1988
DE 4339488 A1 5/1995

(Continued)

OTHER PUBLICATIONS

Office Action dated Nov. 3, 2014 from German Patent Office—reference No. 102014102295.5.

*Primary Examiner* — Mark Hellner
(74) *Attorney, Agent, or Firm* — Nath, Goldberg & Meyer; Jerald L. Meyer

(57) ABSTRACT

The invention relates to a sensor for determining a filling level of a liquid fellable into a container, having a light transmitter for transmitting at least one light pulse; having a receiver for receiving at least one reflected back light pulse, wherein the light pulse is at least partly reflect able at a liquid surface; having a control and evaluation unit for controlling the sensor and for evaluating the received back light pulse; and having a coupling and decoupling unit for coupling the light pulse into a liquid jet which can be introduced into the container and for decoupling the back light pulse to the receiver, wherein the control and evaluation unit is configured for determining a time difference between a transmission of the light pulse and a reception of the back light pulse to calculate a distance between the coupling and decoupling unit and the liquid surface.

13 Claims, 2 Drawing Sheets

(56) References Cited

FOREIGN PATENT DOCUMENTS

Figure 1:
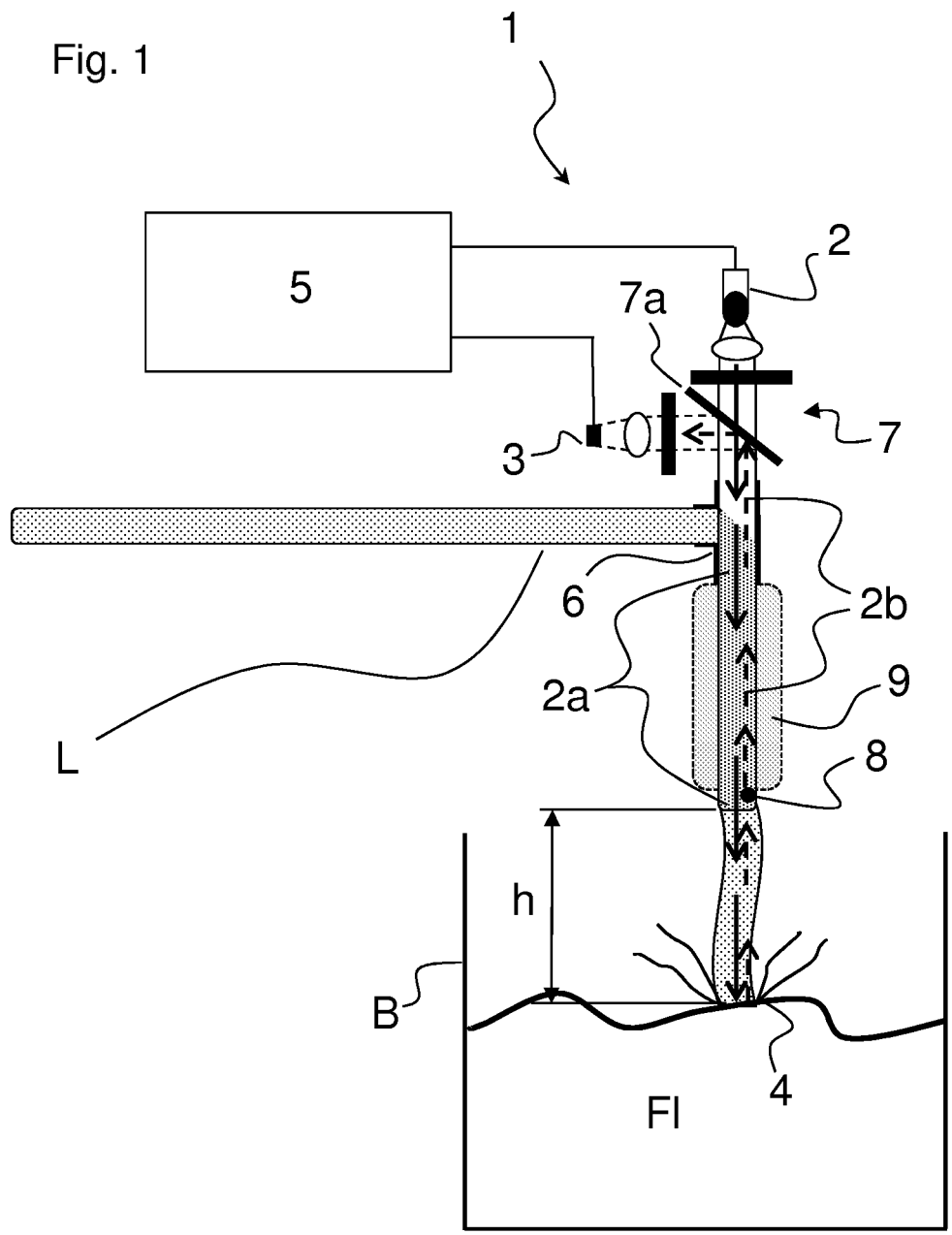

| EP | 0 024 527 A2 | 3/1981 |
| EP | 2601896 A1 | 6/2013 |
| JP | 2000005196 A | 1/2000 |

* cited by examiner t0 < t1 < t2

SENSOR FOR DETERMINING A FILLING LEVEL

The present invention relates to a sensor for determining a filling level of a liquid fillable into a container.

Different methods and/or apparatus are known for determining the filling level on a filling of a container with liquid which are based on different physical principles.

For example, the filling level is determined, on the one hand, by means of a sensor based on a change of the electrical properties or, on the other hand, by means of a sensor based on sound waves or electromagnetic waves.

On the use of a sensor which determines the change of the electrical properties, a changing measured electrical current is measured between two electrodes to obtain the filling level of the liquid in the container from it. The liquid to be measured must be electrically conductive for this purpose.

With a sensor based on sound waves or on electromagnetic waves, the sound waves or electromagnetic waves are either transmitted in the container and the reflected sound waves or electromagnetic waves are detected or are conducted along a probe in the container and a change of the probe is measured by dipping into the liquid.

The current filling level of the liquid in the container can be determined with reference to a transit time of the sound waves or of the electromagnetic waves between the transmission and the reception of the sound waves or of the electromagnetic waves in the first case or of a value of an absorption of the sound waves or of the electromagnetic waves through the liquid in the second case.

It is an object of the present invention to improve a sensor for determining a filling level of a liquid fillable in a container such that an exact determination of the filling level is possible.

The object is satisfied in accordance with the invention by a sensor for determining a filling level of a liquid fillable in a container, having a light transmitter for transmitting at least one light pulse; having a receiver for receiving at least one reflected back light pulse, wherein the light pulse is at least partly reflectable at a liquid surface; having a control and evaluation unit for controlling the sensor and for evaluating the received back light pulse; and having a coupling and decoupling unit for coupling the light pulse into a liquid jet which can be introduced into the container and for decoupling the back light pulse to the receiver, wherein the control and evaluation unit is configured for determining a time difference between a transmission of the light pulse and a reception of the back light pulse to calculate a distance between the coupling and decoupling unit and the liquid surface.

In this respect, the invention has the advantage that a focused reflection of the light pulse at the liquid surface can be achieved by a guide of the light pulse in the liquid jet so that a higher energy of the back light pulse is available for the evaluation with respect to an open reflection on the liquid surface. Furthermore, a measurement distance of the sensor is not unnecessarily restricted by the use of the liquid jet as the conductive medium.

In accordance with the invention, coupling in is inter alia understood such that the light pulse transmitted by the transmitter is introduced or directed into the liquid jet by the coupling and decoupling unit such that the light pulse propagates in the liquid jet. Decoupling analogously means the reverse process in which the reflected back light pulse exits the liquid jet and is conducted or directed in the direction of the receiver.

In accordance with a preferred embodiment, the light pulse comprises ultraviolet light, visible light or infrared light. The wavelength of the light pulse is in particular to be selected in dependence on the optical property of the liquid. I.e. the wavelength of the light pulse has to lie in a region of the light permeability of the liquid jet.

In accordance with a further preferred embodiment, the coupling and decoupling unit has a reflection unit which is configured to transmit the transmitted light pulse in the direction of the liquid jet and to deflect the reflected back light pulse in the direction of the receiver. It is hereby advantageous that the sensor does not have any measurement elements which are arranged in the liquid.

In accordance with a further preferred embodiment, a jet guide unit is provided for bundling the liquid jet and is configured to shape the liquid jet along a predefined path in a predefined direction, preferably in the direction of the liquid surface. This has the advantage that the liquid jet maintains its shape over a substantially larger distance so that the light pulses and back light pulses are conducted in an improved manner.

In accordance with a further preferred embodiment, the jet guide unit comprises a material which is impermeable for the wavelength of the light pulse so that the light pulse and the back light pulse can be conducted along the jet guide unit in the liquid jet.

In accordance with a further preferred embodiment, the coupling and decoupling unit has a connection unit which connects the coupling unit and decoupling unit to a line of a filing system. The connection unit is advantageously configured to direct the liquid jet in the direction of the liquid surface and to transmit the light pulse and the reflected back light pulse.

In accordance with a further preferred embodiment, the control and evaluation unit is configured to obtain a first reference signal when the light pulse passes the reflection unit and to obtain a second reference signal when the light pulse passes an opening of the jet guide unit arranged toward the liquid surface. The control and evaluation unit thereby has a plurality of signal data available for the evaluation.

In accordance with a further preferred embodiment, the control and evaluation unit is configured to determine a starting point in time for a measurement process from the first reference signal and to determine a reference point in time for the measurement process from the second reference signal. A more exact evaluation of the transit time of the light pulse and thus of the distance between the sensor and the liquid surface can advantageously be carried out by means of the additional points in time at the point in time of the back light pulse.

In accordance with a further preferred embodiment, the control and evaluation unit is connected to a rotor which is provided in the line of the filling system and which can be driven by the liquid in the line.

In accordance with a further preferred embodiment, an operating energy of the sensor can be sourced by rotation of the rotor which belongs to a generator. The advantage results from this that the filling system supplies the sensor with energy and energy is only generated and is consumed by the sensor during a filling process.

In accordance with a further preferred embodiment, an activation of the sensor can be triggered by the rotation of the rotor and the control and evaluation unit is configured to suppress the rotation of the rotor. It is hereby ensured that, on the one hand, the sensor is ready for operation at the start of a filling process and, on the other hand, the control and evaluation unit interrupts the filling by suppression of a rotation of the rotor on a reaching of a predefined filling level.

In accordance with a further preferred embodiment, the control and evaluation unit is configured to transmit the light pulse in a specific time period and to shorten the time period with the time duration of a measuring procedure.

Figure 2:
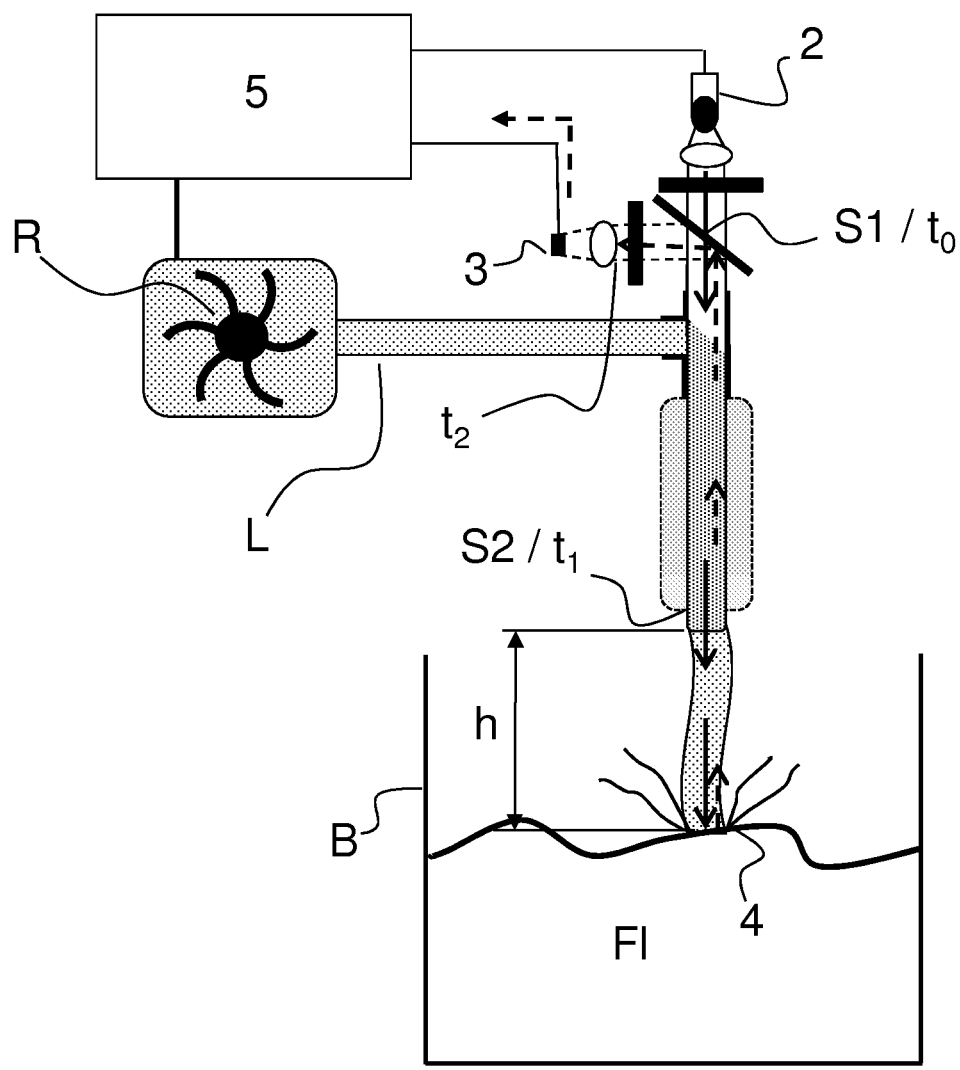

Advantageous embodiments and further developments as well as further advantages of the invention can be seen from the dependent claims, from the following description and from the drawings. Advantageous embodiments of the invention will be explained in more detail in the following with reference to the drawings. In this respect, the invention is not restricted to the application example explained in more detail. There are shown, partly in schematic form:

FIG. 1 a schematic representation of a filling system with a sensor in accordance with the invention; and FIG. 2 a schematic evaluation of the control and evaluation unit of the sensor in accordance with the invention.

FIG. 1 schematically shows a filling system which comprises a container B and a line L. The liquid Fl to be filled is introduced in the line L in the direction of the container B and is introduced in it in the form of a liquid jet 8.

To control and monitor the filling of the container B, a sensor 1 is provided at an exit opening of the line L for determining a filling level h of the liquid Fl in the container B.

The sensor 1 has a light transmitter 2, a receiver 3 and a control and evaluation unit 5. The light transmitter 2 serves to transmit at least one light pulse 2a which is directed in the direction of a liquid surface 4 in the container B. In this respect, the light pulse 2a can comprise ultraviolet light, visible light or infrared light. The wavelength of the light pulse 2a is to be selected in dependence on the optical property of the liquid Fl. I.e. the wavelength of the light pulse 2a has to lie in a region of the light permeability of the liquid jet 8.

On the incidence of the liquid jet 8 onto the liquid surface 4 in the container B, a turbulence of the liquid surface 4 arises locally which behaves like a reflection surface for the light pulse 2a. The light pulse 2a reflects at this reflection surface and forms a reflected back light pulse 2b which is detected by the receiver 3.

The sensor 1 furthermore has a coupling and decoupling unit 7 having a connection unit 6, wherein the connection unit 6 connects the coupling and decoupling unit 7 to the exit opening of the line L of the filling system. The sensor 1 is thus fastened to the filling system and is directed in the direction of the container B via the coupling and decoupling unit 7.

In this respect, the connection unit 6 is also provided to direct the liquid Fl from the line L of the filling system in the form of the liquid jet 8 in the direction of the container B, in particular of the liquid surface 4, and to transmit the light pulse 2a and the reflected back light pulse 2b.

On the filling of the container B, the liquid Fl thus flows along the line L into the connection unit 6 of the sensor 1 and is directed in the direction of the container B.

A jet guide unit 9 for bundling the liquid jet 8 is provided, wherein the jet guide unit 9 is configured to guide the liquid jet 8 along a predefined path, i.e. corresponding to a length of the jet guide unit 9, in a predefined direction, preferably in a direct direction to the liquid surface 4. The liquid jet 8 is thereby forced to maintain its shape over a substantially greater distance before it breaks apart and swirls.

The jet guide unit 9 advantageously comprises a material which is impermeable for the wavelength of the light pulse 2a so that the light pulse 2a and the back light pulse 2b can be conducted in the liquid jet 8 along the jet guide unit 9 without attenuation. I.e. the light pulse 2a and the back light pulse 2b can in particular not emit from the liquid jet 8 and thus lose intensity.

The coupling and decoupling unit 7 furthermore has a reflection unit 7a which is configured to transmit the transmitted light pulse 2a in the direction of the liquid jet 8 and to deflect the reflected back light pulse 2b in the direction of the receiver 3.

No measuring sensor elements which may be considered as "foreign bodies" in the liquid Fl are arranged in the liquid Fl or in the liquid jet 8 due to such a design of the coupling and decoupling unit 7, but in particular of the sensor 1. A purity requirement of the liquid Fl would thus be achievable in a simple manner.

There are furthermore no measuring sensor elements in direct contact with the liquid Fl so that, on the one hand, a wear of the sensor 1 is reduced and, on the other hand, an operating life of the sensor 1 is increased.

In accordance with the invention, the control and evaluation unit 5 is provided for controlling the sensor 1 and for evaluating the received reflected back light pulse 2b, wherein the control and evaluation unit 5 is configured to determine a time difference between the transmission of the light pulse 2a and the receiving of the back light pulse 2b. The control and evaluation unit 5 calculates a distance between the coupling and decoupling unit 7 and the liquid surface 4 from the time difference so that the current filling level h of the container B is determined.

The measuring process is shown schematically with reference to FIG. 2.

The control and evaluation unit 5 causes the light transmitter 2 to transmit the light pulse 2a in a specific time period.

When the light pulse 2a passes the reflection unit 7a, the control and evaluation unit 5 receives a first reference signal S1 and when the light pulse 2a passes an opening of the jet guide unit 9 arranged toward the liquid surface 4, the control and evaluation unit 5 receives a second reference signal S2.

The control and evaluation unit 5 determines a starting point in time t0 for a measuring process from the first reference signal S1. The control and evaluation unit 5 detects an intensity of the light pulse 2a with the starting point in time t0.

The control and evaluation unit 5 determines a reference point in time t1 at which the light pulse 2a or the liquid jet 8 exits the jet guide unit 9 from the second reference signal S2. The intensity of the light pulse 2a at this reference point in time t1 is likewise detected by the control and evaluation unit 5.

The light pulse 2a reflects at the liquid surface 4 and the formed back light pulse 2b is deflected at the reflection unit 7a to the receiver 3 and is detected by the control and evaluation unit 5 at a point in time t2. The intensity of the back light pulse 2b at the point in time t2 is likewise determined by the control and evaluation unit 5.

The control and evaluation unit 5 determines a transit time of the light pulse 2a with reference to the time difference between the transmission of the light pulse 2a and the reception of the back light pulse 2b and determines from this the distance between the liquid surface 4 and the coupling and decoupling unit 7 or the sensor 1. The control and evaluation unit 5 can deduce the filling level h of the liquid Fl in the container B very precisely from this.

To increase the precision of the measurement of the filling level h, the control and evaluation unit 5 is configured to shorten the time period in which the light pulse 2a is transmitted by the time duration of the measuring process so that an interval between the transmission of two light pulses 2a becomes smaller and smaller.

The detected points in time t0, t1, t2 and the simultaneously detected intensities can furthermore be used to compensate errors in the measurement.

A rotor R which belongs to a generator, not shown, and which is arranged in a sealing manner for the line L is furthermore advantageously provided in the line L. The rotor R is connected to the control and evaluation unit 5.

The liquid Fl flowing in the direction of the container B in the line L drives the rotor R so that energy is generated. The energy generated is supplied to the control and evaluation unit 5 of the sensor 1 so that the sensor 1 has an autonomous energy supply.

The operating state of the sensor 1 can furthermore be activated by the provision of the energy via the control and evaluation unit 5 so that an additional process security is ensured in the filling of the container by a monitoring by the sensor 1.

I.e. as soon as the liquid Fl flows into the line L, the sensor 1 is activated and the filling process is monitored.

The control and evaluation unit 5 of the sensor 1 is advantageously configured to suppress the rotation of the rotor R in addition to a stop signal to the filling system on a reaching of a predefined filling level h so that the filling process is ended by stopping the liquid supply due to a stop of the filling system and of the rotor R. Increased security in the filling process can thus be achieved by a redundant switching off of the liquid supply.

REFERENCE NUMERAL LIST

| | |
|---|---|
| 1 | sensor |
| 2 | light transmitter |
| 2a | light pulse |
| 2b | back light pulse |
| 3 | receiver |
| 4 | liquid surface |
| 5 | control and evaluation unit |
| 6 | connection unit |
| 7 | coupling and decoupling unit |
| 7a | reflection unit |
| 8 | liquid jet |
| 9 | jet guide unit |
| B | container |
| Fl | liquid |
| h | filling level |
| L | line |
| R | rotor |
| S1, S2 | first and second reference signals |
| t0 | starting point in time |
| t1, t2 | reference points in time |

The invention claimed is:

1. A sensor for determining a filling level of a liquid fellable into a container, comprising
    a light transmitter for transmitting at least one light pulse;
    a receiver for receiving at least one reflected back light pulse, wherein the light pulse is at least partly reflectable at a liquid surface;
    a control and evaluation unit for controlling the sensor and for evaluating the received back light pulse; and
    a coupling and decoupling unit for coupling the light pulse into a liquid jet which can be introduced into the container and for decoupling the back light pulse to the receiver,
    wherein the control and evaluation unit is configured for determining a time difference between a transmission of the light pulse and a reception of the back light pulse to calculate a distance between the coupling and decoupling unit and the liquid surface,
    wherein the coupling or decoupling unit has a reflection unit which is configured to transmit the transmitted light pulse in the direction of the liquid jet and to deflect the reflected back light pulse in the direction of the receiver.

2. The sensor in accordance with claim 1, wherein the light pulse comprises ultraviolet light, visible light or infrared light.

3. The sensor in accordance with claim 1, further comprising a jet guide unit for bundling the liquid jet, the jet guide unit being configured to shape the liquid jet along a predefined path in a predefined direction.

4. The sensor in accordance with claim 3, in which the jet guide unit is configured to shape the liquid jet along a predefined path in a direction of the liquid surface.

5. The sensor in accordance with claim 3, wherein the jet guide unit comprises a material which is impermeable for a wavelength of the light pulse so that the light pulse and the back light pulse can be conducted along the jet guide unit in the liquid jet.

6. The sensor in accordance with claim 1, wherein the coupling and decoupling unit has a connection unit which connects the coupling and decoupling unit to a line of a filling system.

7. The sensor in accordance with claim 6, wherein the connection unit is configured to direct the liquid jet in the direction of the liquid surface and to transmit the light pulse and the reflected back light pulse.

8. A sensor for determining a filling level of a liquid fillable into a container, comprising:
    a light transmitter for transmitting at least one light pulse;
    a receiver for receiving at least one reflected back light pulse, wherein the light pulse is at least partly reflectable at a liquid surface;
    a control and evaluation unit for controlling the sensor and for evaluating the received back light pulse; and
    a coupling and decoupling unit for coupling the light pulse into a liquid jet which can be introduced into the container and for decoupling the back light pulse to the receiver,
    wherein the control and evaluation unit is configured for determining a time difference between a transmission of the light pulse and a reception of the back light pulse to calculate a distance between the coupling and decoupling unit and the liquid surface, wherein the control and evaluation unit is configured to obtain a first reference signal when the light pulse passes the reflection unit and to obtain a second reference signal when the light pulse passes an opening of the jet guide unit arranged toward the liquid surface.

9. The sensor in accordance with claim 8, wherein the control and evaluation unit is configured to determine a starting point in time for a measurement process from the first reference signal and a reference point in time for the measurement process from the second reference signal.

10. A sensor for determining a filling level of a liquid fillable into a container, comprising
    a light transmitter for transmitting at least one light pulse;
    a receiver for receiving at least one reflected back light pulse, wherein the light pulse is at least partly reflectable at a liquid surface;

a control and evaluation unit for controlling the sensor and for evaluating the received back light pulse; and a coupling and decoupling unit for coupling the light pulse into a liquid jet which can be introduced into the container and for decoupling the back light pulse to the receiver, wherein the control and evaluation unit is configured for determining a time difference between a transmission of the light pulse and a reception of the back light pulse to calculate a distance between the coupling and decoupling unit and the liquid surface, wherein the control and evaluation unit is connected to a rotor which is provided in the line of the filling system and which can be driven by the liquid in the line.

11. The sensor in accordance with claim 10, wherein an operating energy of the sensor can be sourced by rotation of the rotor which belongs to a generator.

12. The sensor in accordance with claim 10, wherein an activation of the sensor can be triggered by the rotation of the rotor, and wherein the control and evaluation unit is configured to suppress the rotation of the rotor.

13. A sensor for determining a filling level of a liquid fillable into a container, comprising a light transmitter for transmitting at least one light pulse;

a receiver for receiving at least one reflected back light pulse, wherein the light pulse is at least partly reflectable at a liquid surface;

a control and evaluation unit for controlling the sensor and for evaluating the received back light pulse; and a coupling and decoupling unit for coupling the light pulse into a liquid jet which can be introduced into the container and for decoupling the back light pulse to the receiver, wherein the control and evaluation unit is configured for determining a time difference between a transmission of the light pulse and a reception of the back light pulse to calculate a distance between the coupling and decoupling unit and the liquid surface, wherein the control and evaluation unit is configured to transmit the light pulse in a specific time period and to shorten the time period over the time duration of a measurement process.

* * * * *